Patented Feb. 17, 1948

2,436,156

UNITED STATES PATENT OFFICE 2,436,156

PREPARATION OF SHAPED OBJECTS, FILAMENTS, AND THE LIKE

Robert William Upson, Wilmington, Del., assignor to E. I. du Pont de Nemours & Company, Wilmington, Del., a corporation of Delaware No Drawing. Application August 19, 1943, Serial No. 499,251

3 Claims. (Cl. 28—82)

This invention relates to solutions of reduced keratinous proteins and shaped structures therefrom.

Numerous processes have been described for the preparation of synthetic protein films, filaments, and fibers from solutions of proteins, e. g., globulins, prolamins, and phosphoproteins, which are characterized by their solubility in dilute alkali. These processes fail with the alkali-insoluble keratinous proteins, however, due to the degrading action of the alkali employed in preparing protein solutions. The preparation of fibers from solutions of keratinous proteins dissolved in viscose or cuprammonium solution has been described. The keratin in these solutions is, however, severely degraded by the strong alkali present.

It is an object of this invention to prepare stable solutions of reduced keratinous proteins suitable for the preparation of shaped structures. It is a further object of this invention to prepare these solutions without appreciable degradation of the protein molecular structure. Still another object is to convert the reduced proteins in these solutions into shaped structures, particularly films, filaments, and fibers. Other objects will appear hereinafter.

These objects are accomplished by the following invention wherein a keratinous protein in which substantially all the disulfide linkages have been split by reduction is dissolved, regenerated and the regenerated reduced wool is dissolved to form a solution containing at least 10% by weight of the protein in an aqueous solution having a pH of at least 10 and containing at least 0.5% of an alkaline substance selected from the groups consisting of an alkali metal hydroxide, a basic salt of an alkali metal hydroxide or ammonium hydroxide, the solution is formed into a shaped structure, and the protein is coagulated.

In carrying out the process of this invention, a regenerated keratinous protein in which substantially all the disulfide linkages have been split by reduction is dissolved in an aqueous solution containing 0.5–2.0% sodium hydroxide. This solution after suitable filtration by the usual methods can be spun into fibers in standard wet spinning equipment using an acid-salt coagulating bath or cast into films by standard wet casting procedures.

For effective results, in the preparation of yarns, it is necessary to purify the reduced keratin by the following procedure. Reduced keratin is agitated for 16 hours at room temperature with an aqueous solution containing 1% sodium hydroxide. The resulting alkaline solution is clarified by filtration through a glass wool pad to remove a small amount of undissolved material and the reduced protein regenerated by slowly pouring the alkaline filtrate, with stirring, into a solution containing 2.5% sulfuric acid. The regenerated, reduced keratin is collected on a filter, washed with acetone and air-dried. Since some oxidation of thiol groups may occur in precipitation of the protein, it is desirable to treat the regenerated protein with a reducing agent, such as thioglycolic acid, just prior to dissolving it in dilute alkali to form the final spinning solution. From this step on, the entire preparation is carried out in an inert atmosphere. The regenerated, reduced protein is washed free of thioglycolic acid with oxygen-free distilled water, and the water displaced by grinding the product with acetone. The product may then be dried in a rotating glass tube through which a stream of inert gas is passed. Feasible spinning solutions have not been obtained without passing through the steps of reduction, solution and regeneration prior to the preparation of the final spinning solution. Reduced wool does not, without regeneration and re-solution, give solutions of sufficient concentration and viscosity suitable for spinning unless such high concentrations of alkali are used that the wool is degraded.

This purified reduced keratin is used in the following procedure for the preparation of solutions suitable for the production of shaped structures. The dried, regenerated, reduced protein is agitated with oxygen-free distilled water for several minutes in order to wet the protein. It is often desirable to add a water-soluble salt of a polymeric carboxylic acid, such as the monosodium salt of styrene/maleic acid interpolymer, to the water used to wet the regenerated wool, as these salts aid in dispersion of the protein. A dilute sodium hydroxide solution is then added to bring the alkali concentration to desired amount (0.5–2.0% concentration) and agitation is continued at room temperature for about one hour. The solution is clarified by centrifuging, followed by filtration. It is then degassed and stored in an inert atmosphere to avoid oxidation of the thiol groups. A thin layer of an inert liquid, such as kerosene, may be placed on the surface of the solution to retard oxidation of the reduced protein on exposure to air. Solutions prepared in this manner have a density of 1.1 and a viscosity of 12–60 poises.

Fibers are spun from these solutions of reduced keratin in the standard equipment usually used for spinning viscose. From the spinneret the solution is extruded into an acid-salt coagulating bath. The coagulating bath may be equipped with rollers around which the filaments issuing from the spinneret are led in order to increase the time in which the filaments are in contact with the coagulating solution. In some cases the coagulated fibers are removed from the coagulating bath, stretched in an aqueous solution containing 20% sodium chloride at a temperature of 80–90° C. and then hardened in a solution containing formaldehyde and inorganic salts. An appropriate hardening solution is one containing 7.6% sodium chloride, 3.9% aluminum sulfate and 3.3% formaldehyde. The resulting fibers are rinsed with water and air-dried. They may be used in continuous filament form or cut into staple.

The preparation of films from solutions of regenerated, reduced protein in dilute alkali is accomplished by casting a layer of the alkaline protein solution of any desired thickness on a glass plate, coagulating the film in an acid-salt coagulating bath, such as that described for the coagulation of fibers, followed by a hardening treatment in a bath containing inorganic salts and formaldehyde. A plasticizer, such as glycerol, may be added to the protein solution in order to increase the pliability of the films.

To prepare films from solutions of reduced keratin protein in dilute ammonium hydroxide, the following procedure is used. The regenerated, reduced protein is agitated with an aqueous solution containing 1% thioglycolic acid at room temperature for about one hour. Concentrated ammonium hydroxide is then added and agitation continued for 1–2 hours. The resulting solution is clarified by filtration and degassed. A layer of this solution is cast onto a glass plate and the protein coagulated by evaporation of the ammonia. A plasticizer, such as glycerol, may be added to the protein solution to increase the pliability of these films.

The more detailed practice of the invention is illustrated by the following examples, wherein parts given are by weight. There are, of course, many forms of the invention other than these specific embodiments.

Example I

Two hundred and fifty parts of wool fiber, reduced by suspending 260 parts of wool fiber in 75 parts (1.5%) of 1-thiosorbitol, 2300 parts of water and 2370 parts of a 0.1 N sodium hydroxide solution for one hour at 25° C., rinsing, and air-drying the product, is suspended in 9300 parts of water. The suspension is agitated at room temperature until the reduced wool is thoroughly wet with water and then 376 parts of a 29.3% solution of sodium hydroxide solution is added and agitation continued at room temperature for 16 hours. The resulting alkaline solution is clarified by filtration through a glass wool pad to remove any undissolved material and the reduced wool is regenerated by slowly pouring the alkaline filtrate, with stirring, into a solution containing 6,000 parts of water and 150 parts of concentrated sulfuric acid. The regenerated wool is collected on a filter, washed with water and acetone and air-dried. In order to insure complete reduction of the disulfide linkages, the regenerated product is treated with 6,000 parts of a 10% thioglycolic acid solution, buffered at a pH of 5.5 with 1,000 parts of a citric acid-disodium acid phosphate buffer solution, for 16 hours at room temperature. The regenerated, reduced wool is collected on a filter inside a nitrogen cabinet in which a positive pressure of nitrogen always prevails, washed free of thioglycolic acid with air-free distilled water, and dried with acetone. The acetone is removed by drying the product in a rotating glass tube through which a stream of nitrogen is passed.

A solution is prepared by agitating 470 parts of the regenerated, reduced wool with a solution containing 1570 parts of oxygen-free water and 110 parts of an aqueous solution containing 25% of hydrolyzed, partially neutralized styrene/maleic anhydride (50:50) interpolymer having a pH of 5.5 and having roughly one-half of the carboxyl groups neutralized with sodium hydroxide. After 20 minutes, 65 parts of a 26% sodium hydroxide solution is added and agitation continued in an atmosphere of nitrogen. The final solution contains 21.2% regenerated, reduced wool, 1.24% hydrolyzed styrene/maleic anhydride interpolymer, and 0.76% sodium hydroxide. In 2 to 3 hours the regenerated wool is practically all dissolved. The solution is filtered through a glass wool pad to remove any sizable particles and the filtrate from this operation is centrifuged for 30 minutes at 2500 R. P. M. to aid in separating any finely divided particles not dissolved. The centrifuged solution is then filtered at 40 pounds pressure through an assembly of filter cloth and wire screen. Degassing of the solution is accomplished by subjecting it to reduced pressure or by allowing it to stand at 5° C. for 10–16 hours.

This composition is spun in ordinary viscose spinning equipment. A thin layer of kerosene is placed upon the surface of the spinning solution to retard oxidation of the reduced wool on contact with air. The solution is forced under 18 pounds/sq. in. of nitrogen pressure to a gear pump which forces the material at a regulated rate through a candle filter and spinneret into a coagulating bath. The coagulating bath contains 20 parts sodium sulfate, 4 parts aluminum sulfate, 1.9 parts sulfuric acid and 74.1 parts of water and is maintained at a temperature of 60° C. In the coagulating bath the yarn is passed under a roller at the end opposite the spinneret and from this roller is led directly to the windup bobbin. The windup speed is maintained at about 1800 in./min. and the jet velocity at about 720 in./min. The yarn is rinsed with water to remove acid from the coagulating bath and then immersed for 24 hours at room temperature in a solution containing 76 parts sodium chloride, 39 parts aluminum sulfate, 33 parts formaldehyde, and 852 parts of water. The hardened fibers are washed with water and dried. These fibers have dry and wet tenacities of 0.6 and 0.25 g./d. respectively.

Example II

A spinning solution is prepared by agitating 400 parts of regenerated, reduced wool, prepared as described in Example I, with a solution containing 1325 parts of oxygen-free water and 176 parts of an aqueous solution containing 25% of hydrolyzed, partially neutralized styrene/maleic anhydride (50:50) interpolymer at a temperature of 40° C. for 30 minutes. One hundred fifteen parts of a 28% sodium hydroxide solution is then added and agitation continued for one hour. The solution is filtered, centrifuged, and degassed as described in Example I. The final solution contains 19.8% regenerated, reduced wool, 2.18% hydrolyzed styrene/maleic anhydride interpolymer, and 1.59% sodium hydroxide.

This composition is spun into a coagulating bath and the fibers are subsequently stretched in a hot aqueous salt solution. The coagulating bath contains 20 parts sodium sulfate, 4 parts aluminum sulfate, 4 parts glucose, 1-15 parts sulfuric acid, and 71-57 parts water. In the coagulating bath the yarn is passed around 6 rollers, mounted in such a manner that they are free to rotate about vertical shafts and so placed in the coagulating bath that the yarn travels 150 inches in the coagulating solution. From the last roller the yarn is led to a variable speed Godet wheel around which it is led 4 to 5 times and then passed into a solution containing 20 parts sodium chloride and 80 parts water, maintained at a temperature of 88-90° C. The yarn is removed from the salt bath and collected on a bobbin by means of a variable speed windup. The jet velocity is maintained at about 360 in./min., the Godet wheel at 430-624 in./min. and the windup at 1380-2232 in./min. It is thus possible to apply from 120-600% stretch to the coagulated fibers in the sodium chloride solution. The stretched fibers are rinsed and hardened as described in Example I.

Yarn coagulated in baths containing 0.5 to 2.0% sulfuric acid can be stretched from 200-400% in the sodium chloride solution and, after hardening with formaldehyde, has dry, wet, and loop tenacities of 1.1, 0.45, and 0.9 g./d., respectively, and corresponding elongations of 10, 20, and 7%. Furthermore, it is pliable and soft and contains very few stuck filaments. Yarn coagulated in baths containing 4-10% sulfuric acid can be stretched from 200-600% in the sodium chloride solution and has about the same tensile and elongation properties as yarn coagulated in baths containing less acid. It is more brittle, however, than the yarn coagulated in baths containing 0.5 and 2.0% sulfuric acid and contains numerous stuck and broken filaments.

*Example III*

A spinning solution is prepared as described in Example I from 500 parts of regenerated, reduced wool, 1600 parts air-free water, 220 parts of a 25% solution of hydrolyzed styrene/maleic anhydride interpolymer and 112 parts of 26% sodium hydroxide solution. The final solution contains 20.6% regenerated, reduced wool, 2.26% hydrolyzed styrene/maleic anhydride interpolymer and 1.22% sodium hydroxide. This composition is spun as described in Example I into a coagulating bath maintained at a temperature of 45° C. which contains 20 parts sodium sulfate, 4 parts aluminum sulfate, 2 parts sulfuric acid, and 74 parts water. The regenerated yarn is placed in a solution containing 20 parts sodium sulfate, 4 parts aluminum sulfate, and 76 parts water for 16 hours. The fibers are then stretched 166% in a bath containing 20 parts sodium chloride and 80 parts water maintained at a temperature of 88-90° C. The stretched fibers are rinsed, hardened, and dried as described in Example I. The stretched fibers have dry and wet tenacities of 0.9 and 0.4 g./d., respectively, as compared to dry and wet tenacities of 0.6 and 0.25 g./d. respectively, obtained on unstretched yarn.

*Example IV*

A spinning solution is prepared and spun as described in Example III except that the yarn is wound up at a speed of 988"/min. The yarn is placed in a solution containing 20 parts sodium sulfate, 4 parts aluminum sulfate, 20 parts of a 3% hydrogen peroxide solution, and 56 parts of water. After standing in this solution at room temperature overnight, the fibers are rinsed with water and air-dried. Yarns prepared in this manner have dry and wet tenacities of 0.5 and 0.2 g./d., respectively.

*Example V*

A solution containing 90 parts regenerated, reduced wool, 20 parts of an aqueous solution containing 25% of hydrolyzed styrene/maleic anhydride (50:50) interpolymer, 327 parts water, and 6.9 parts of a 42.4% solution of sodium hydroxide is prepared as described in Example I. The final solution contains 20% regenerated, reduced wool, 1.14% hydrolyzed styrene/maleic anhydride interpolymer, and 0.65% sodium hydroxide. A film is cast from this solution and immersed for one hour in a bath containing 20 parts sodium sulfate, 4 parts aluminum sulfate, 0.5 part sulfuric acid, and 75.5 parts water maintained at a temperature of 45° C. The film is rinsed with water and treated for 16 hours with the hardening solution described in Example I.

*Example VI*

A solution is prepared by agitating 11 parts of regenerated, reduced wool prepared as described in Example I, with 17 parts of water and 2 parts of glycerol. After 2-3 hours, 10 parts of concentrated ammonium hydroxide containing at least 28% ammonia is added and agitation continued for 12 hours. The final solution contains 27.5% regenerated, reduced wool, 5% glycerol, and 7% ammonia. The solution is filtered and degassed as described in Example I. A film is cast from this solution and coagulated by evaporation of the ammonia at a temperature of 115° C. for 20 minutes. Films prepared in this manner are clear, tough, and pliable, and show good tensile properties.

*Example VII*

Films are cast from a solution containing 5 parts regenerated, reduced wool, 6 parts glycerol, 4 parts concentrated ammonium hydroxide and 50 parts water, and coagulated in a bath containing 20 parts sodium sulfate, 1.0 part sulfuric acid, and 79 parts water maintained at a temperature at 25° C. These films are clear and transparent but more brittle than those prepared in Examples V and VI.

*Example VIII*

A solution is prepared by agitating 5 parts of regenerated, reduced chicken feather keratin, prepared by the method described in Example I, with 45 parts water, 1 part thioglycolic acid, and 7 parts glycerol at room temperature. After two hours 15 parts concentrated ammonium hydroxide solution is added and agitation continued for one-half hour. The solution is filtered and degassed as described in Example I. A film is cast from this solution and coagulated by evaporation of the ammonia at 115° C. for 15-20 minutes. The film is clear, transparent and pliable.

*Example IX*

A solution containing 5 parts of regenerated, reduced human hair keratin, 45 parts water, 1 part thioglycolic acid, 7 parts glycerol, and 10 parts of concentrated ammonium hydroxide solution is prepared, cast into films, and coagulated as described in Example VIII. These films are clear and pliable.

Example X

A solution containing 5 parts of regenerated, reduced cattle hoof keratin, 3 parts thioglycolic acid, 40 parts water, 7 parts glycerol, and 20 parts concentrated ammonium hydroxide is prepared, cast into films, and coagulated as described in Example VIII. These films are transparent, flexible, and show fairly good tensile properties.

Example XI

A solution containing 5 parts regenerated, reduced cattle horn keratin, 3 parts thioglycolic acid, 40 parts water, 7 parts glycerol, and 10 parts ammonium hydroxide is prepared as described in Example VIII. Films are cast from this solution and coagulated as described in Example VIII. These films are clear, pliable, and fairly strong.

In carrying out the process of this invention any reduced keratinous material may be used. Reduced animal hair, particularly wool, is especially suitable and may be used in the form of reduced wool fiber, thread, yarn, fabric, or wool waste such as rags or shoddy. Various other types of reduced animal hair, such as camel hair, mohair, horse hair, cattle hair, hog bristles, human hair, etc. are likewise suitable for use in this invention. Still other types of reduced keratinous material that may be used include chicken feathers, animal hoofs, horns, and horn tips, etc. It is preferable to use keratinous material reduced under conditions which split substantially all the disulfide linkages but which do not cause degradation of the polypeptide chains. It is desirable to use keratinous protein in which at least 50% of the disulfide linkages have been split by reduction in order to avoid degradation on dissolving the protein in dilute alkali. The reduction may be accomplished by any of the procedures known to the art, e. g. with mercapto alcohols according to Arthur and Goebel U. S. 2,238,672, mercaptans according to Turley et al. 1,973,130, or with other reducing agents as in Speakman, U. S. 2,201,929, care being employed to prevent degradation, e. g., by the use of sufficiently dilute alkali.

The reduced keratin can be used directly for the preparation of solutions, but the solutions obtained are not suitable for the preparation of useful films and fibers. It is preferable, therefore, to purify the reduced keratin by a solution and regeneration process. In this process reduced keratinous protein that is still wet with the reducing solution is extracted with dilute alkali. If the reduced keratinous material has been washed free of reducing agent, it is desirable to add 0.2-1.0% of a water-soluble reducing agent such as 1-thiosorbitol, thioglycolic acid, sodium sulfide, sodium thiosulfate, etc. to the alkaline solution used to extract the keratinous material in order to retain the protein in the reduced state during the extraction procedure. In extracting the reduced keratinous proteins, the amount of reduced protein may be varied from 0.5-10% based on the total weight of solution. It is preferable to use from 1.5-2.5% reduced protein as this amount readily dissolves in dilute alkaline solutions with little apparent degradation. The alkaline substances used to extract the reduced protein may be alkali metal hydroxides or basic salts of alkali metal hydroxides. The preferred agents are sodium hydroxide and potassium hydroxide. The concentration of alkali may be varied from 0.2-20%. Best results in the solution and regeneration process are obtained by using 0.8-1.5% alkali based on the total weight of solution, as substantially all of the reduced protein dissolves in this concentration of alkali without apparent degradation. The time and temperature are interdependent variables. At a temperature of 25° C. the dilute alkali dissolves the reduced keratin in 4-16 hours, while at higher temperatures the protein dissolves in less time. While any temperature from 25-100° C. may be employed, it is preferable to operate at temperatures of 25-50° C. as the dilute alkali is less likely to degrade the reduced protein in this range. The reduced protein is regenerated by acidification of this alkaline solution. It is desirable to clarify the alkaline solution by filtration prior to acidification in order to remove any impurities or undissolved protein. Any water soluble organic or inorganic acid may be used for the precipitation of the reduced protein from the alkaline solution. It is desirable to use dilute solutions since concentrated acid solutions have a degrading action on keratinous proteins. The preferred procedure is to pour the alkaline solution slowly with stirring, into a 3% solution of sulfuric acid at room temperature.

The regenerated, reduced protein may be used directly in the preparation of solutions suitable for the production of shaped structures. It is usually desirable to treat the regenerated protein with a reducing agent just prior to dissolving it in dilute alkali in order to insure complete reduction of the disulfide linkages. The reducing procedure may be similar to that described in Cline and Signaigo, Serial No. 438,508, filed April 10, 1942 wherein the keratinous material is treated for 1 to 20 hours at 20-50° C. with a solution, preferably aqueous, of a water-soluble mercapto alcohol, preferably 5 to 20 parts per part of keratinous material. The solution may be buffered and the treatment is preferably continued to complete reduction as indicated by iodimetric titration of mercapto alcohol consumed. The regenerated, reduced protein may be used directly in the preparation of solutions or it may be washed, preferably with oxygen-free water, and dried in an inert atmosphere. An inert atmosphere may be defined as one that will not degrade the protein or that will not react with the thiol groups in the reduced protein. The preferred inert atmosphere is one of nitrogen.

In preparing the final spinning or casting solutions regenerated, reduced keratin is dissolved in a dilute alkaline solution preferably in the presence of a water-soluble salt of a polymeric carboxylic acid. These salts aid in dispersing the reduced protein in dilute alkali. Suitable synthetic polymeric carboxylic acids include styrene/maleic acid interpolymers, polyacrylic acid, polymethacrylic acid, methacrolein/methacrylic acid interpolymers, methyl methacrylate/methacrylic acid interpolymers, ethylene/maleic acid interpolymers, etc. The maleic acid interpolymers may conveniently be prepared by hydrolyzing the maleic anhydride interpolymers as described in U. S. 2,047,398, and in Hanford, Serial No. 410,337, filed September 10, 1941 (now U. S. 2,378,629).

The basic agents used in the preparation of the solutions of this invention are water-soluble inorganic monoacid bases, i. e., alkali metal hydroxides, basic salts of alkali metal hydroxides, or ammonium hydroxide. Of these the strong bases, sodium hydroxide, potassium hydroxide, and sodium sulfide, are preferred for spinning solutions while ammonium hydroxide may be used for film casting solutions.

Spinning solutions suitable for use in this invention are those containing between 10 and 40% reduced protein and between 0.25 and 5.0% alkali based on the total weight of solution. The preferred composition contains 15–30% reduced protein and 0.5 to 2.0 alkali based on the total weight of solution. Lower concentrations, i. e., as low as 5% keratin, may be used for film casting solutions. The ratio of polymeric carboxylic acid salt to reduced protein may be varied within wide limits. These salts aid in dispersing the reduced protein in dilute alkali and also have some solvent action. Thus the concentration of reduced protein, alkali, and salts of polymeric carboxylic acids are interdependent variables. It is preferred to use solutions containing 15–30% regenerated, reduced protein, 1 to 5% of the water-soluble salt of a polymeric carboxylic acid and 0.5 to 2.0% of alkali based on the total weight of solution. When ammonium hydroxide is used as the solvent, the amount of ammonia may be varied from 5 to 50% based on the total weight of solution.

In preparing these solutions the ingredients may be added in any desired order. It is desirable, however, to wet the reduced protein before the alkali is added. The reduced protein may be dissolved at temperatures between 0 and 80° C. We prefer to use temperatures between 30 and 50° C., however, as the protein dissolves at this temperature in less time without apparent degradation. It is also desirable to prepare the solutions from oxygen-free reagents in an inert atmosphere to prevent oxidation of the thiol groups. This need not be done if a water-soluble reducing agent such as sodium sulfide, sodium thiosulfate, hydroquinone, pyrogallic acid, etc. is added to the dilute alkali used to dissolve the reduced protein. The concentration of reduced protein, alkali and salt of a polymeric carboxylic acid and the time and temperature required to produce suitable solutions for the practice of this invention depend upon the extent to which the disulfide linkages in the protein have been reduced. It is preferable to use regenerated keratinous protein in which all of the disulfide linkages are reduced to thiol groups as these materials dissolve readily in dilute alkali without apparent degradation. Regenerated keratins in which 80–90% of the disulfide linkages are reduced to thiol groups can be used in this invention. It is even possible to use keratins in which only 50% of the disulfide linkages are reduced although these materials do not dissolve as readily in dilute alkali as those in which a higher percentage of the disulfide linkages are reduced.

The coagulating and insolubilizing baths determine to a large extent the final properties of the particular composition being shaped. For the preparation of filaments, acidic baths containing a high percentage of inorganic salts are suitable coagulating baths. The acidic solutions used for coagulation of casein fibers have proved suitable for use in this invention. Either salt solutions alone or baths containing up to 20% sulfuric acid may be used. It is preferable to use baths containing from 0.25 to 2.0% sulfuric acid as the fibers coagulated in these baths are more pliable, contain fewer stuck filaments, and have superior physical properties to those coagulated in baths of higher acidity. Temperatures of 20–100° C. may be maintained in the coagulating bath although temperatures 25 to 70° C. are preferred. The coagulating bath may also contain insolubilizing agents such as formaldehyde or oxidizing agents such as hydrogen peroxide or potassium dichromate.

An alternative procedure for coagulation of fibers involves spinning into a gaseous atmosphere which may be heated to hasten removal of water from the filaments and may contain volatile acids to neutralize the basic components of the spinning solution. Insolubilizing agents such as formaldehyde may also be present in the atmosphere.

In spinning fibers from solutions of reduced keratinous protein in dilute ammonium hydroxide solutions, the well-known dry spinning techniques may be employed. An insolubilizing agent such as formaldehyde may be present in the atmosphere used to coagulate the fibers.

The regenerated keratin fibers or films may be insolubilized by any desired after-treatment. For example, they may be insolubilized by treatment with an aldehyde such as formaldehyde or by treatment with a bifunctional crosslinking agent such as an alkylene dihalide, dibasic acid halides, dichloroethers, etc. Insolubilization may even be accomplished by treatment with an oxidizing agent such as hydrogen peroxide, potassium dichromate, potassium permanganate, hydrogen peroxide or by merely exposing the shaped structure to air.

The preferred insolubilization and "hardening" of fibers is accomplished by treating them in a bath containing formaldehyde and at least one polyvalent metal salt known to have a tanning action, such as aluminum sulfate or chromium chloride. The preferred salt is aluminum sulfate. The insolubilizing and hardening bath in addition may contain other materials such as sodium chloride, sodium sulfate, sodium acetate, oxidizing agents, such as hydrogen peroxide, potassium dichromate, potassium permanganate, etc., or bifunctional crosslinking agents, such as alkylene dihalides, diacid chlorides, dichloroethers, etc.

Fibers with superior properties are obtained by stretching them at some stage in their preparation. The fibers may be stretched in the coagulating bath by means of appropriate rollers or yarn driven pulleys. The fibers may also be stretched outside the coagulating bath. For example, a 2-bath spinning set up may be employed in which the fibers are coagulated in the first bath and stretched in the second. The stretching bath may comprise an inorganic salt or a mixture of various inorganic salts. Suitable salts include sodium chloride, sodium acetate, sodium sulfate, aluminum sulfate, etc. Other substances such as oxidizing agents or crosslinking agents may also be present in the stretching bath. Suitable oxidizing agents include hydrogen peroxide, potassium dichromate, ferric chloride, etc., while crosslinking agents such as alkylene dihalides, diacid chlorides, dichloroethers, etc. may be added. The salt concentration of the stretching bath should be at least 5% and the bath should be maintained at a temperature greater than 50° C. The preferred salt concentration lies between 10 and 30% and the preferred temperature between 70 and 100° C. The amount of stretch which may be applied in the secondary bath depends on the temperature and composition of the secondary bath and on the amount of stretch which is applied in the coagulating bath. Fibers prepared using the process of this invention may be stretched from 100 to 600%. In general the higher the degree of stretch the higher the dry and wet tenacities and elongations of the final product.

In the preparation of films by this invention the protein solution may be cast onto any suitable base material and coagulated and insolubilized with the same solutions and under the same conditions as described above for the preparation of filaments. Films cast from solutions of reduced protein in dilute ammonium hydroxide solutions may be coagulated by evaporation of the ammonia or by neutralization in an acid-salt coagulating bath. If coagulated by heat, the temperature may vary from 25 to 150° C. The preferred temperature range is 50 to 125° C. The solutions used for the preparation of films may contain other materials such as plasticizers, oxidizing agents or crosslinking agents.

The products of this invention are useful as textile fibers, wrapping films, and fabric coating compositions. The fibers may be used alone or blended with rayon, cellulose acetate, cotton materials, or wool to produce products more attractive from the standpoint of cost or physical attractiveness. The films are chiefly useful as wrapping and packaging materials.

The above description and examples are intended to be illustrative only. Any modification of or variation therefrom which conforms to the spirit of the invention is intended to be included within the scope of the claims.

I claim:

1. A spinning solution for the preparation of keratin fibers comprising an aqueous solution, having a viscosity of 12–60 poises, containing 0.5 to 2.0% aqueous caustic alkali, 15–30% acid-coagulated reduced wool and 1–5% of a water-soluble alkali metal salt of a polymeric carboxylic acid, said acid-coagulated reduced wool being prepared by reduction, alkali solution, clarification, and coagulation.

2. A spinning solution for the preparation of keratin fibers which comprises an aqueous solution, having a viscosity of 12–60 poises, comprising 10–40%, acid-coagulated reduced wool, 0.25 to 5.0% caustic alkali and a water-soluble alkali metal salt of a polymeric carboxylic acid, said acid-coagulated, reduced keratin being prepared by reduction, alkali solution, clarification, and coagulation.

3. A continuous filament consisting essentially of acid-coagulated hardened wool fiber having a dry tenacity of at least 1.0 g./d., a wet tenacity of at least 0.4 g./d., an elongation dry of about 10% and an elongation wet of about 20% said filament being prepared by the process which comprises dissolving in aqueous alkali a reduced wool having at least 50% of its disulfide linkages split by reduction, precipitating the reduced wool by acidification, dissolving the precipitated reduced wool in aqueous caustic alkali containing a water-soluble alkali metal salt of a polymeric carboxylic acid to form an aqueous solution, of viscosity of 12 to 60 poises, comprising 10 to 40% acid-insoluble, reduced wool, 0.25 to 5.0% caustic alkali and 1 to 5% of the water-soluble alkali metal salt of the polymeric carboxylic acid and spinning the solution into a coagulating bath.

ROBERT WILLIAM UPSON.

REFERENCES CITED

The following references are of record in the file of this patent:

UNITED STATES PATENTS

| Number | Name | Date |
|---|---|---|
| 2,337,398 | Marsh | Dec. 21, 1942 |

FOREIGN PATENTS

| Number | Country | Date |
|---|---|---|
| 487,056 | Great Britain | June 14, 1938 |
| 505,756 | Great Britain | May 12, 1939 |
| 538,338 | Great Britain | July 30, 1941 |
| 830,101 | France | May 9, 1938 |

OTHER REFERENCES

Goddard, A Study of Keratin, J. Biol. Chem., vol. 106, pp. 605, 614, 607.

Michaelis, A Study of Keratin, J. Amer. Leather Chemists Assoc., vol. XXX, No. 11, Nov. 1935, pp. 557–568.

Goddard, J. Biol. Chem., vol. 112 (1935), pp. 361–371.